United States Patent [19]

Matthews et al.

[11] 3,896,410

[45] July 22, 1975

[54] ROTARY CONTROL

[75] Inventors: Benjamin H. Matthews, Peninsula; Jules W. Rhine, Bedford; Suresh K. Nangia, Bedford Heights, all of Ohio

[73] Assignee: Lucerne Products Inc., Hudson, Ohio

[22] Filed: Aug. 6, 1973

[21] Appl. No.: 386,230

[52] U.S. Cl. .................. 338/48; 338/159; 338/173; 338/174

[51] Int. Cl. ............................................. H01c 9/08

[58] Field of Search ............ 338/48, 174, 162, 159, 338/172, 173, 179; 318/345

[56] References Cited

UNITED STATES PATENTS

| | | | |
|---|---|---|---|
| 2,480,218 | 8/1949 | Burnell | 338/159 |
| 3,450,941 | 6/1969 | Butts | 338/162 UX |
| 3,585,559 | 6/1971 | Rozema et al. | 338/48 |

*Primary Examiner*—Arthur T. Grimley
*Assistant Examiner*—David A. Tone
*Attorney, Agent, or Firm*—Baldwin, Egan, Walling & Fetzer

[57] ABSTRACT

A compact electrical energy control for regulating the magnitude of electrical energy input into a circuit of an electrically powered device such as for example, portable tools, power appliances, etc. The control includes a rotary actuator mounting spaced electrically conducting contacts thereon and a printed circuit including resistance means oriented into generally arcuate configuration, coacting with the contacts of the rotary actuator, for providing a plurality of resistance values as determined by the position of the rotatable actuator. The arrangement is such that a highly compact, reliable, electrical energy control device having a considerable range of magnitude control is provided.

20 Claims, 25 Drawing Figures

ROTARY CONTROL

This application relates in general to a compact control for controlling the operation of an electrically powered device, such as for instance the motor of a power tool or a power appliance, or the like, and it more particularly relates to a compact rotary control which provides for a substantial range of control of the magnitude of electrical energy input into the circuit of the electrically powered device, for more expeditious and precise control of the electrically powered device.

BACKGROUND OF THE INVENTION

There are numerous control mechanisms including various arrangements of motor speed control mechanisms, known in the prior art for controlling power actuated devices such as for instance controlling the speed of an electric motor of a hand operated power tool, or the like.

U.S. Pat. Nos. 3,389,365, 3,536,973 and 3,713,070 issued respectively on June 18, 1968, Oct. 27, 1970 and Jan. 23, 1973, disclose various electrical speed control devices of the above-described type. The circuits of the latter devices generally include variable resistance means including a slidably actuated contact element which moves linearly, for regulating the magnitude of electrical energy input to the circuit input. In such speed control arrangements, the linearly movable contact element and an associated bridging electrical contact element are actuated either by means of a manually operated linearly movable trigger actuator, or a rotatable actuator. Still other control devices are disclosed in U.S. Pat. RE. 26,119 and wherein movable contact members in circuit with a semi-conductor control element variably control the application of electrical energy to a connected load.

SUMMARY OF THE INVENTION

The present invention provides a highly compact electrical energy control for an electrically powered device, and which includes a rotary actuator having electrical contacts thereon adapted for coaction with a circular-like resistance mat or track to define a variable resistor, the configuration of which provides a substantially longer track over which its associated contact may be moved, and which likewise increases the preciseness of magnitude control of the device.

Accordingly, an object of the invention is to provide a novel electrical control for expeditiously regulating the magnitude of electrical energy input into a circuit.

Another object of the invention is to provide an electrical control which provides a substantial range of control of the magnitude of electrical energy input into a circuit, for more expeditiously controlling an associated electrically powered device.

Another object of the invention is to provide a novel electrical energy control which can be expeditiously manufactured and assembled, and results in a compact control for smoothly and effectively controlling the electrical input into the input circuit of an electrical energy powered device.

Another object of the invention is to provide a compact electrical energy control switch of the variable speed type which includes a rotary stem actuator supporting a plurality of electrical contact means thereon, adapted for movement with the stem actuator relative to a printed circuit of the control, and wherein the printed circuit includes a rheostat resistance mat or track of generally circular configuration, so that movement of the actuator and thus the contacts relative to the resistance adjusts and regulates the magnitude of electrical energy input into an input circuit of an electrical motor powered device, as well as controlling the actuation and deactuation of the circuit.

A still further object of the invention is to provide a compact rotary electrical energy control which includes printed circuit components supported on and applied to a ceramic-like base, all of which is disposed within a housing of miniaturized dimensions, with an actuator stem projecting outwardly of the housing and rotatable about an axis disposed substantially perpendicular to the plane of the printed circuit.

Other objects and advantages of the invention will be apparent from the following description taken in conjunction with the accompanying drawings wherein:

DESCRIPTION OF PREFERRED EMBODIMENTS

Figure 1:
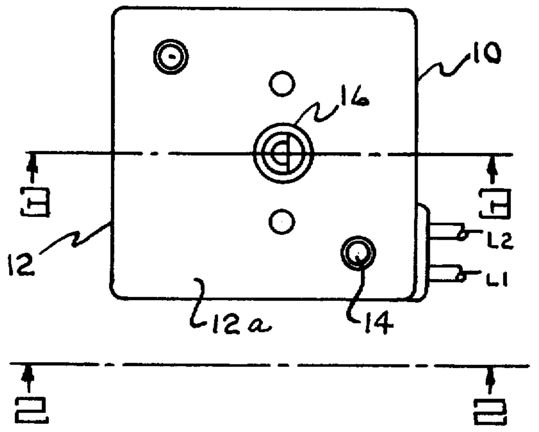
FIG. 1 is a top plan view of the control of the invention.
Figure 2:
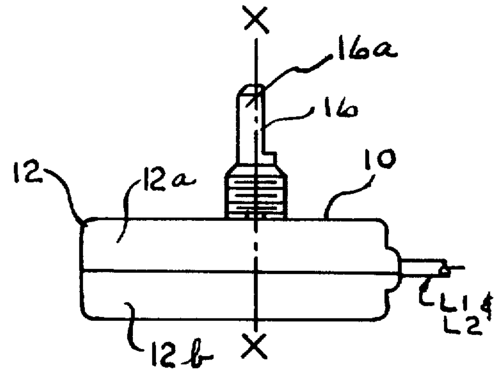
FIG. 2 is an elevational view taken, generally along the plane of line 2—2 of FIG. 1 looking in the direction of the arrows.

Referring now again to the drawings, there is shown a rotary-like control 10 of highly compact form comprising exterior housing 12, which includes an upper housing section $12_a$ and a lower housing section $12_b$, coupled to one another as by means of fasteners 14.

Rotatably mounted on housing 12 and projecting therefrom is a rotary actuator 16 which is adapted for rotation about lengthwise axis X—X thereof, for controlling operation of the control to cause actuation and deactuation of an associated electrically powered device, and for varying the magnitude of electrical energy input into the input circuit of the electrically powered device.

Actuator 16 which is preferably formed of non-conducting material, such as for instance plastic, includes stem $16_a$ and base portion $16_b$ secured thereto. A depending pilot 18 is adapted to facilitate rotatable mounting of the actuator 16 on the lower housing section $12_b$, as can be best seen in FIG. 3.

Mounted on actuator 16 and more particularly on the base $16_b$ thereof is an electrical energy conducting member 19 comprising a series of three electrical contacts $19_a$, $19_b$ and $19_c$. Each of the contacts preferably comprises a generally rounded distal end portion 20 mounted on resilient arm portion 22, for resiliently urging the respective end portion 20 upwardly into engagement with predetermined portions of the downwardly facing printed circuitry of the control, as will be hereinafter set forth.

Figure 10:
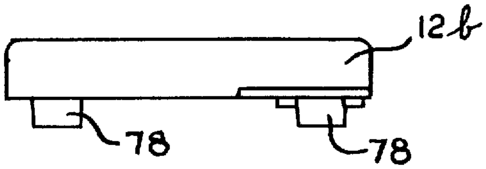
FIG. 10 is an elevational view taken generally along the plane of line 10—10 of FIG. 8 looking in the direction of the arrows.
Figure 10A:
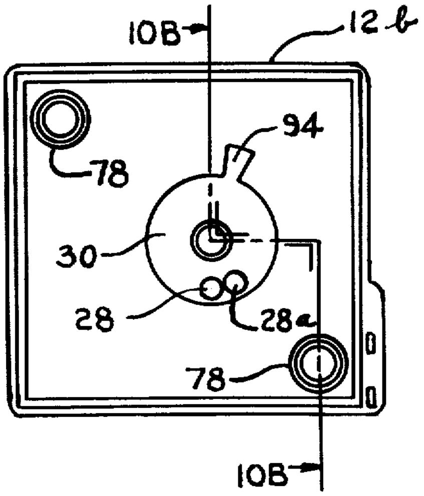
FIG. 10A is a plan view taken generally along the plane of line 10A—10A of FIG. 9 looking in the direction of the arrows.
Figure 10B:
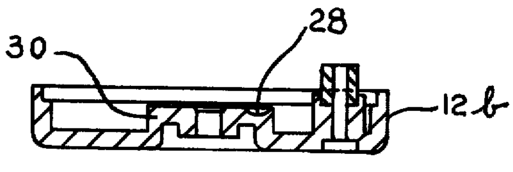
FIG. 10B is a sectional view taken generally along the plane of line 10B—10B of FIG. 10A looking in the direction of the arrows.

The underside of the actuator 16 is preferably provided with downwardly sloping, generally yieldable arm 24 which has a rounded end portion $24_a$ thereon, which is engageable in a respective recess 28, $28_a$ formed in the raised shalf portion 30 of the lower housing section $12_b$, for yieldably positioning the actuator 16 in full on or full off position. The arm 24 because of its generally resilient nature causes the rounded distal end portion $24_a$ to move into the respective complementary recess 28 or $28_a$ when end portion $24_a$ is aligned with the respective recess, and locates the actuator 16 at full on or full off position until the actuator 16 is forcibly rotated to move the distal end $24_a$ of the arm out of the associated recess 28 or $28_a$. As can be seen in FIG. 10A, the top surface of shelf 30 is generally flat for engagement with end portion $24_a$ of arm 24 during rotary movement of actuator 16.

Referring now to FIGS. 16, 17, 18 and 19, there is illustrated a ceramic support disc or slab 34 on which the printed circuitry of the control is located. As can be best understood from FIG. 3, the printed circuitry and certain of the other components of the electrical circuit of the control are mounted on the underside of the ceramic member 34 and in position for coaction with the contacts $19_a$, $19_b$ and $19_c$ on the actuator 16 which passes through member 34.

Figure 13:
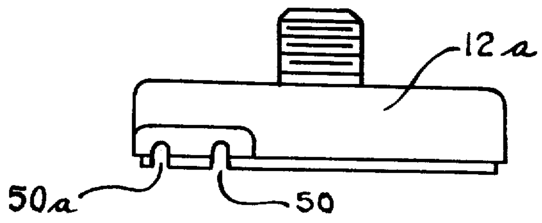
FIG. 13 is an elevational view taken generally along the plane of line 13—13 of FIG. 11 looking in the direction of the arrows.

The resistance section 36 (FIGS. 16, 17 and 20) of the control circuitry may be formed by known printed circuit forming means, and secured onto the confronting surface 38 of the ceramic block or member 34, such resistance section possessing preselected maximum and minimum values of resistance. As can be seen, the resistance section 36 is of generally circular configuration with spur sections 40, $40_a$, and provides for a considerable range of movement of the actuator contacts relative to the resistance section, and thus a considerable range of rheostat control. The printed circuit for the electronic control 10 may be formed or applied to the ceramic support by known silk screen printing processes and then passed through an oven to bake or fire the resistance and conducting materials thereon. The resistance material may be formed for instance from Ruthenium based ink or any other suitable resistance material, many of which are known in the prior art. Resistance section 36 is coupled by means of spur $40_a$ (FIG. 16) to conducting section 44 of the printed circuitry. Conductor section 44, which may be formed for instance from a silver based ink, is coupled to conductor section 46 (FIGS. 16 and 17) by capacitor 48. Conductor section 46 which is the furthest outwardly from the central axis or center Z of the circular configuration portion of the printed circuit, is coupled as by means of solder to wire L2 which enters the housing through opening 50 therein (FIG. 13).

The other side of the line (L1) extends through opening $50_a$ in housing 12 and is connected as by means of solder to conducting section 52 (FIG. 16) of the printed circuitry.

Figure 3:
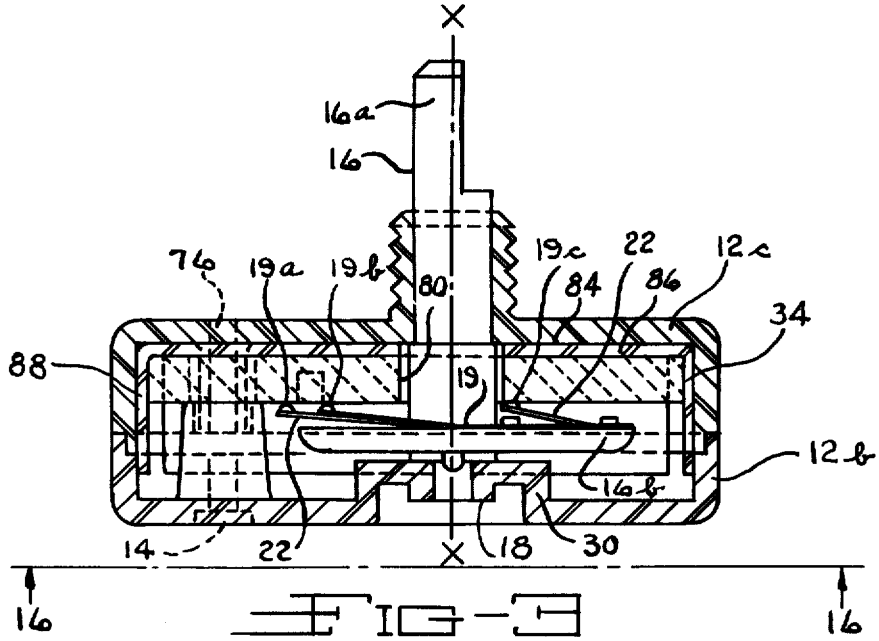
FIG. 3 is an enlarged, sectional view taken substantially along the plane of line 3—3 of FIG. 1 looking in the direction of the arrows.
Figure 3A:
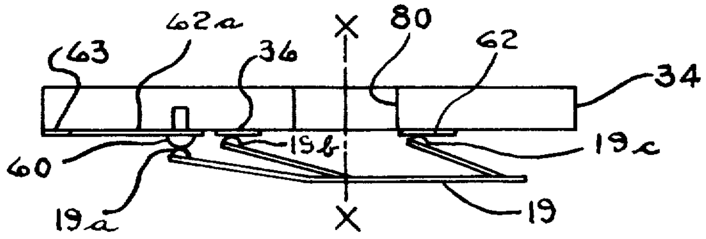
FIG. 3A is a diagrammatic illustration of the electrical contacts of the actuator in the "off" position of the control.
Figure 4:
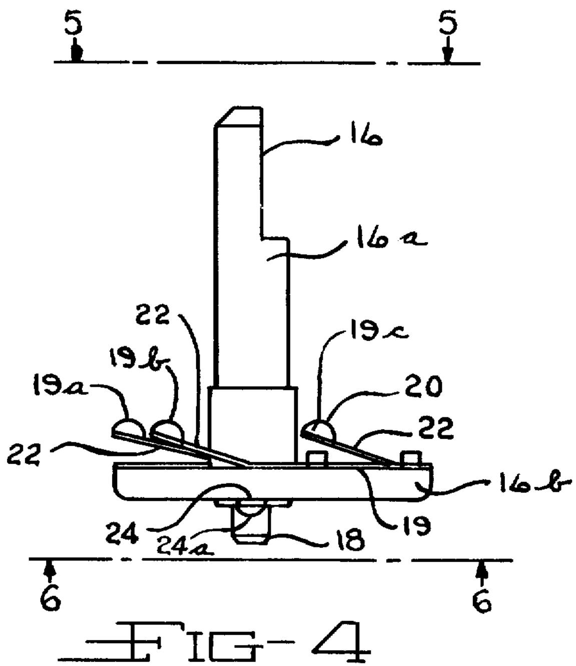
FIG. 4 is an enlarged, side elevational view of the rotary actuator of the control of FIGS. 1, 2, 3, showing the electrical contacts mounted thereon.
Figure 5:
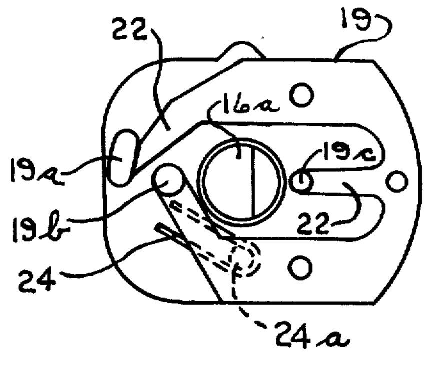
FIG. 5 is a plan view taken generally along the plane on line 5—5 of FIG. 4 looking in the direction of the arrows.
Figure 7:
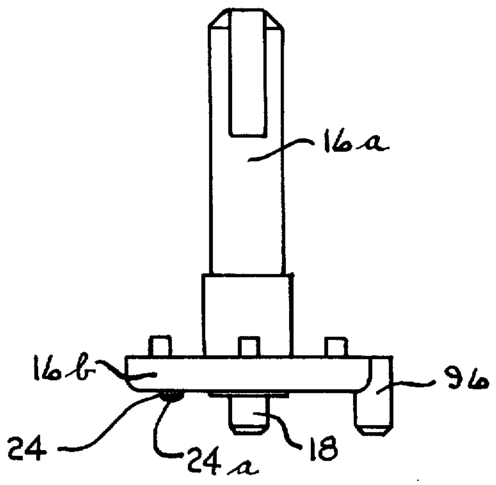
FIG. 7 is an elevational view of the actuator with the electrical contact member having been deleted.

Choke coil 54 (FIGS. 16 and 21) is electrically coupled at one end to conductor section 52, and at its other end to conductor section 56 and thus connects conducting section 56 to section 52. Conducting section 56 is connected to arcuate conducting section 58 via spur conducting section $58_a$. The center of curvature of section 58 is axis Z, which is coincident with aforementioned axis X—X of actuator 16. Conducting section 58 at one end thereof terminates adjacent a cam rivet 60, the purpose of which will be hereinafter set forth, and adjacent its other end terminates adjacent spur $40_a$ of resistance section 36. Rivet 60 is the embodiment illustrated may be of electrical conducting material, and has a rounded head which projects outwardly from the surface of the printed circuitry (FIG. 3A).

Figure 21:
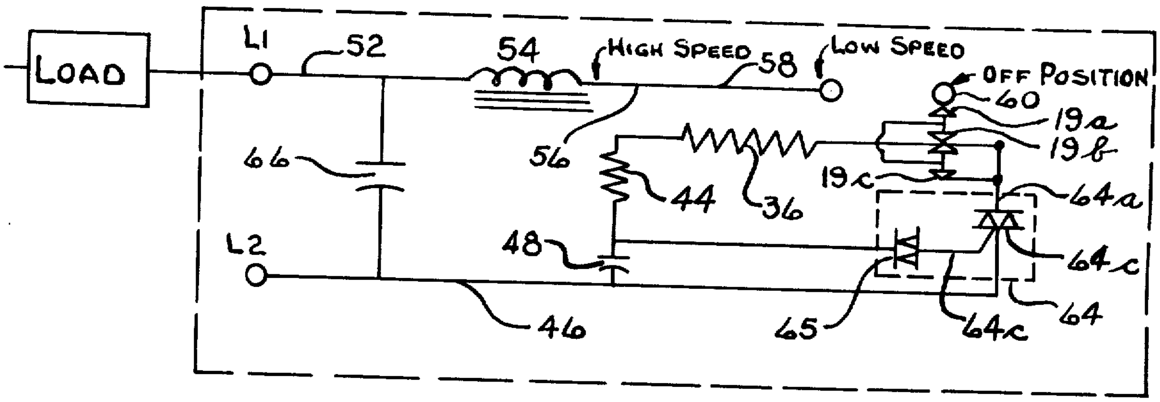
FIG. 21 is a schematic of the rotary control circuitry.

Disposed centrally of the printed circuitry is a generally circular conducting section 62 which is connected via a spur $62_a$ to conducting section 63 which is coupled to variable current control switch 64, which in the embodiment illustrated is a semiconductor device generally known in the art as a triac having anode, cathode and gate electrodes $64_a$, $64_b$, and $64_c$ respectively, (FIG. 21). Other suitable devices such as those referred to as SCR; SCS; ICD; ICS, etc., may also be utilized, if desired. Aforementioned resistance section 36 is outwardly of spur $62_a$. Full wave triggering means 65 of conventional type is in circuit with gate electrode $64_c$.

Figures 19, 20, 22:
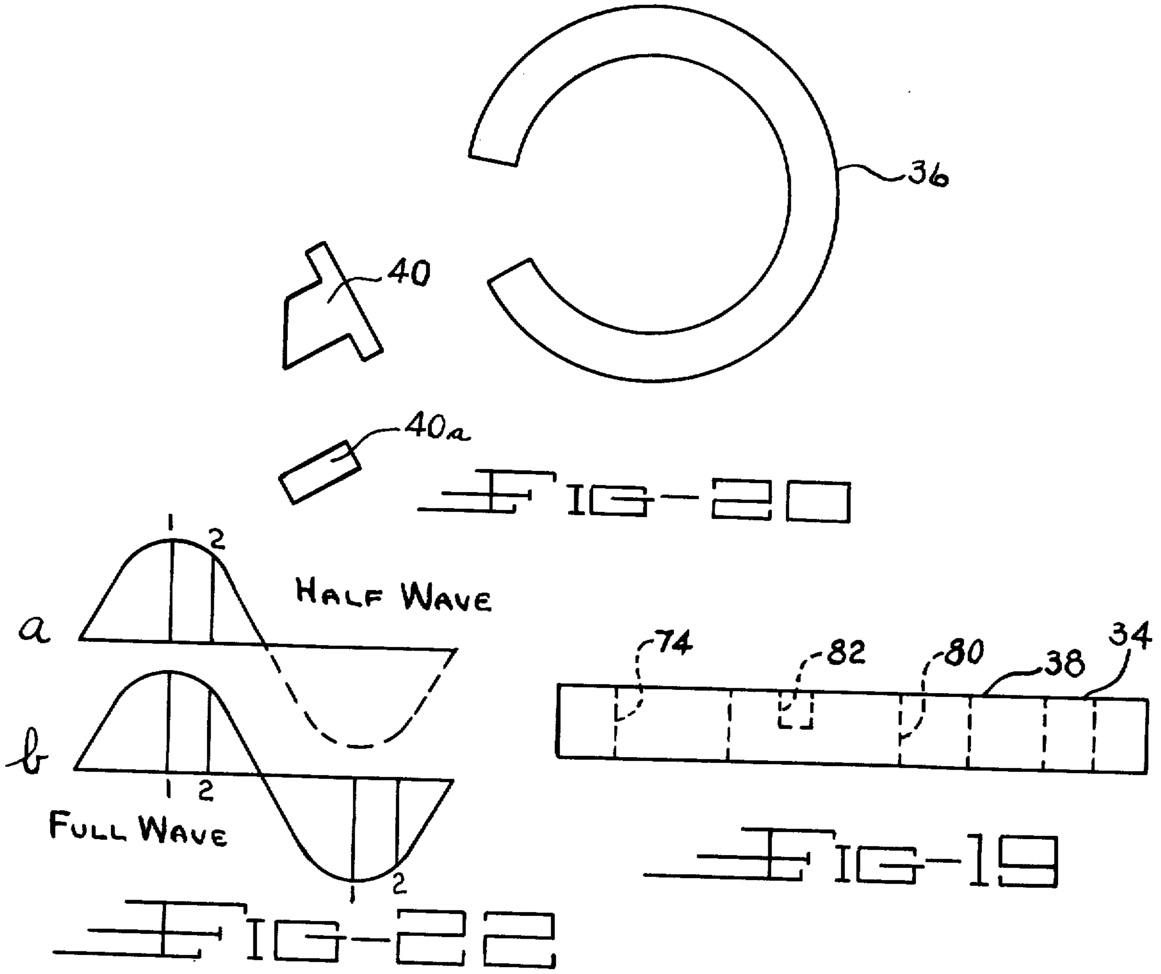
FIG. 19 is an elevational view of the support of FIG. 18.
FIG. 20 is a plan view of the resistance element or mat of the rheostat.
FIG. 22 are typical waveforms illustrating the operational characteristics of the control circuit.

Capacitor 66 is coupled between conductor sections 46 and 52 and thus extends between lines L1 and L2. With such an arrangement it will be seen that the current through the control may be varied in each positive and negative portion of each cycle with the triac turned on during any part of each positive and negative part of the cycle power source, which may be a conventional 60 cycle electrical current source. By varying the RC time constant of the gate circuit for the triac by varying the rheostat, the "on time" for the triac device may be variably changed. FIG. 22, waveform (b), illustrates the "on time" for a full wave control device such as the triac for several time periods 1 and 2, for corresponding settings of the RC gate circuit control. Time period 1, as is understood, represents a longer "on time" period for the triac as compared to time period 2. Likewise, FIG. 22 waveform (a) similarly illustrates the "on time" for a half wave control device, as for example an SCR. If the electrically powered device to which control 10 is coupled is an electric motor, the speed of the electric motor will be varied as the rheostat of the control is moved via actuator 16.

The support 34 which as aforementioned is preferably formed of ceramic material, and mounts the switch means 64, and which switch means 64 is held or secured in position by means of conducting material and coupling anode $64_a$ of switch 64 to conducting section 63. As can be best seen in FIGS. 16 and 21, the cathode $64_b$ of the switch 64 is coupled via conducting wire 70 to conducting section 46, while the gate $64_c$ is coupled via wire $70_a$ to conducting section 44.

Figure 11:
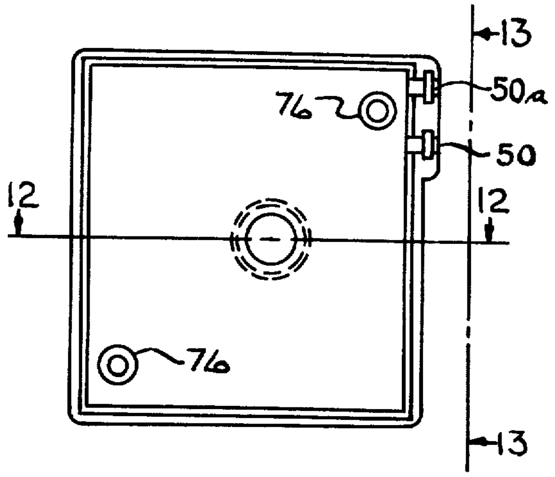
FIG. 11 is a plan view of the interior of the upper housing section of the control.
Figure 12:
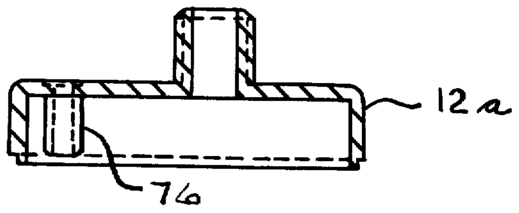
FIG. 12 is a sectional view taken generally along the plane of line 12—12 of FIG. 11 looking in the direction of the arrows.

Support 34 has spaced openings 74 (FIGS. 18 and 19) therethrough, through which are adapted to extend apertured posts 76 (FIGS. 11 and 12) on upper section $12_a$ of housing 12. Lower apertured posts 78 on lower section $12_b$ of housing 12 are adapted to engage and support the support member 34, as best shown in FIG. 3, and aforementioned fasteners 14 extend through the posts 76 and 78 and detachably secure the housing sections together. Opening 80 through support 34 is adapted to receive stem $16_a$ of actuator 16 therethrough (FIG. 3), and openings 81 (FIG. 18) may be provided for facilitating rapid mounting of coil 54 by means of preformed leads $81_a$. Recess 82 may also be provided for mounting of cam rivet 60.

Figures 14, 15:
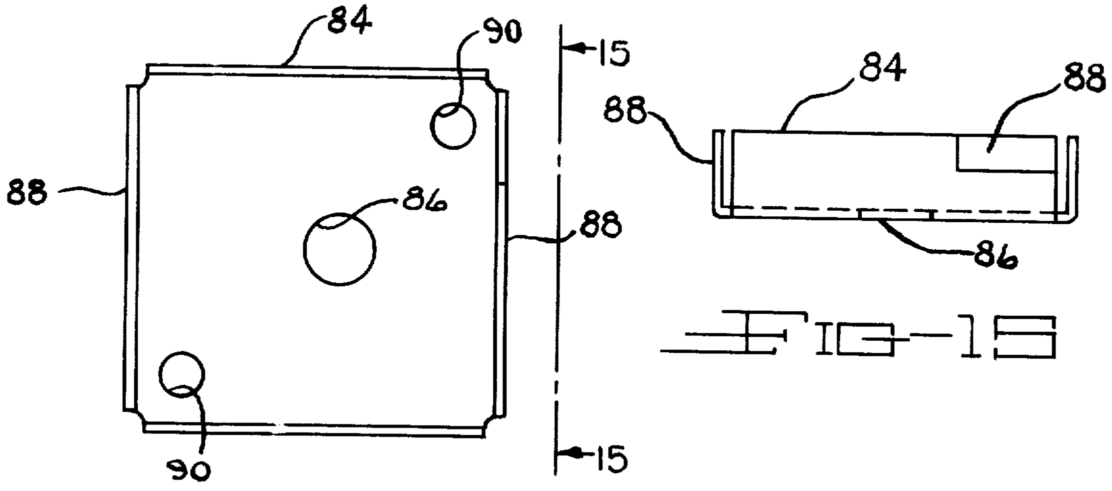
FIG. 14 is a plan view of a heat sink member for the rotary control.
FIG. 15 is an elevational view taken generally along the plane of line 15—15 of FIG. 14 looking in the direction of the arrows.

Heat sink member 84 (FIGS. 14 and 15) receives support 34 therein in emcompassing relation. Member 84 may be made of metal, such as for instance aluminum, and has opening 86 therethrough, through which extends actuator 16. The support member 34 is preferably cemented to member 84 by a thermally conductive cement. As can be seen from FIG. 3, walls 88 preferably extend into lower section $12_b$ of the housing 12. Openings 90 in member 84 provide for passage of posts 76 of upper housing section $12_a$ therethrough.

Figure 6:
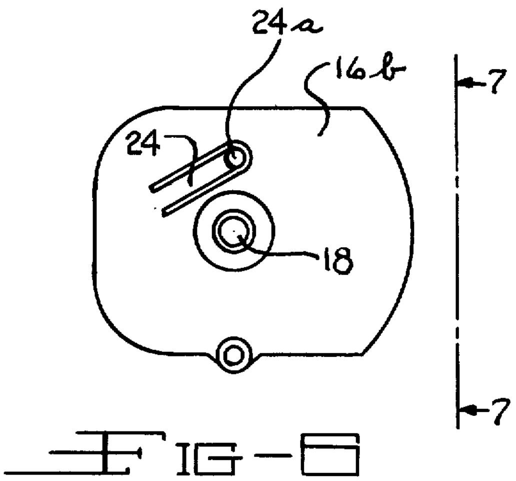
FIG. 6 is a bottom plan view taken generally along the plane of line 6—6 of FIG. 4 looking in the direction of the arrows.
Figure 8:
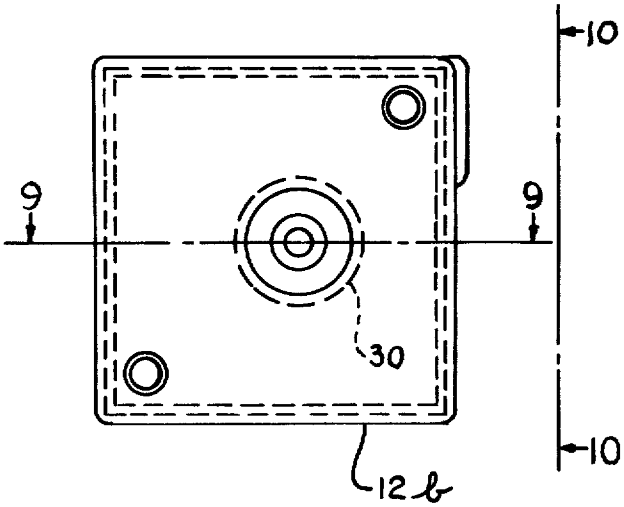
FIG. 8 is a plan view of the exterior of the bottom housing section for the control.
Figure 16:
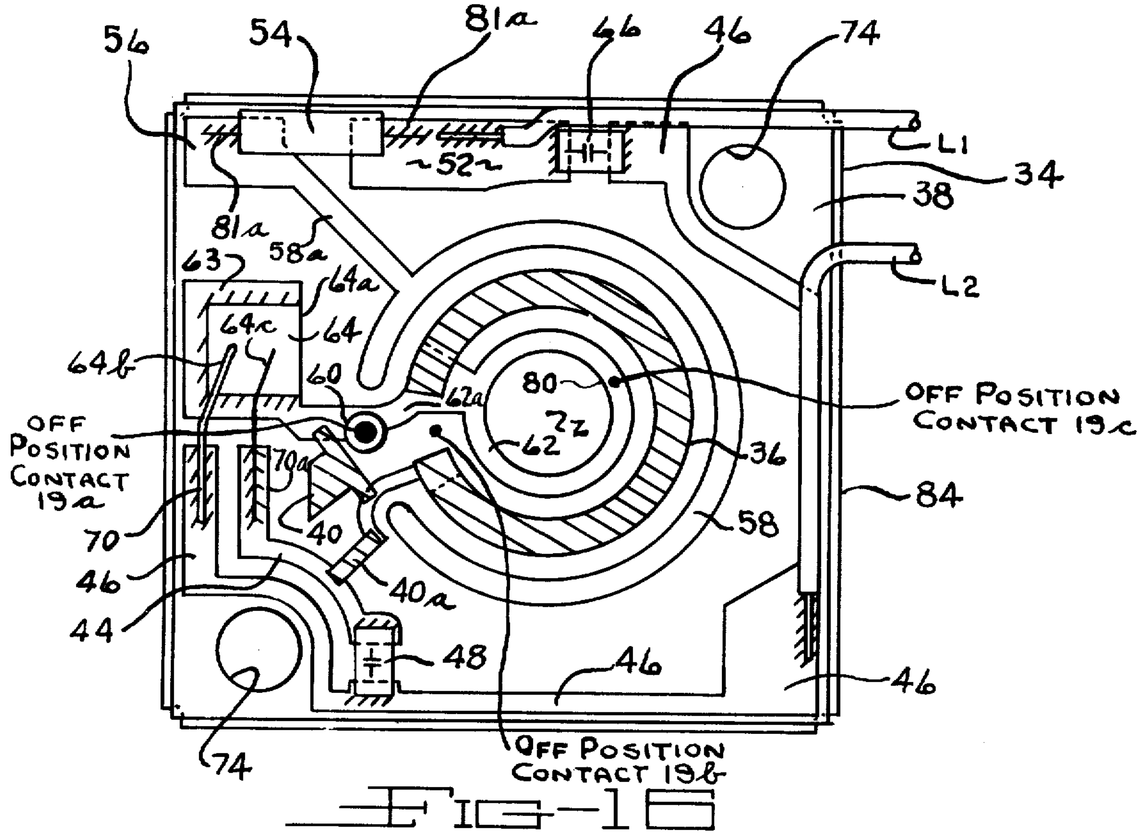
FIG. 16 is a bottom plan view of the printed circuit and other circuit component assembly as mounted on its ceramic support and disposed within the confines of the heat sink of FIGS. 14 and 15.
Figure 17:
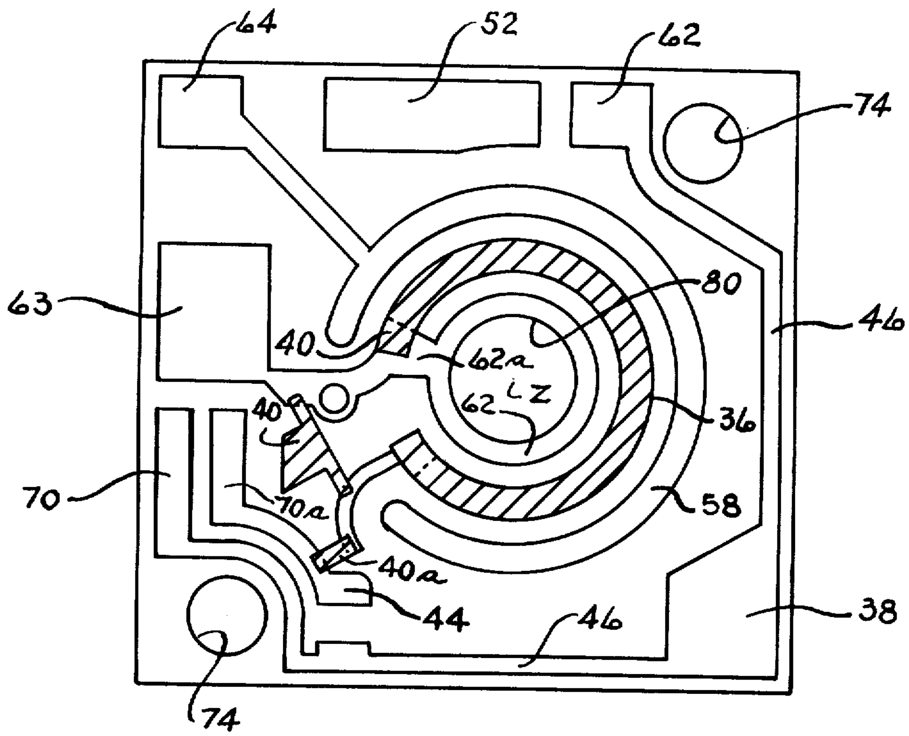
FIG. 17 is a view generally similar to FIG. 16 but showing the printed circuit assembly mounted on the ceramic support prior to insertion of other various circuit components into the circuitry.
Figure 18:
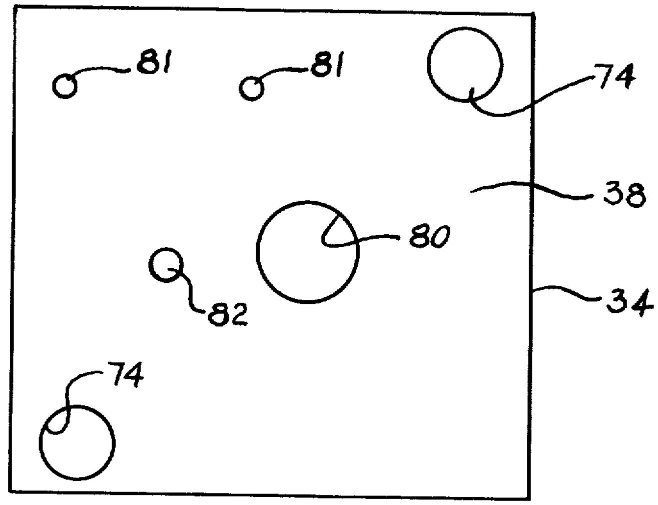
FIG. 18 is a bottom plan view of the ceramic support onto which is applied the circuitry of FIGS. 16 and 17.

Referring now especially to FIGS. 3, 3A and 16, in the "off" position of the control, the contact $19_a$ on actuator 16 is in engagement with the cam rivet 60 and forced out of the common plane of the other contacts $19_b$ and $19_c$ as can be best seen in FIG. 3A, thus disconnecting the circuit from line L1. In this position of the actuator, the detent $24_a$ (FIG. 6) on generally resiliently arm 24 of the base portion $16_b$ of the actuator 16 engages in the recess 28 (FIG. 10A) in embossment 30 on lower casing or housing section $12_b$, to thus positively locate the actuator in "off" position.

To turn the control on, the actuator 16 may be rotated in a counterclockwise direction (with reference to FIG. 1) which causes the contact $19_a$ to move from the camming rivet 60 into engagement with the adjacent end of conductor section 58, while contacts $19_b$ and $19_c$ move relative to respectively resistance section 36 and conducting section 62. In FIG. 16 there is shown the position of contacts $19_a$, $19_b$ and $19_c$ on the actuator member 16 in the "off" position of the control. Due to the resilient nature of the arm portion 22 of the respective contacts $19_a$, $19_b$ and $19_c$, the contact $19_a$ positively engages with the different level of the conducting section 58 automatically upon movement from off to on position of the control.

Continuation of the rotation of the actuator in a counterclockwise direction moves the contact $19_b$ along the resistance 36, as can be seen from FIG. 21, to reduce the resistance of member 36, and likewise moves the contacts $19_a$ and $19_c$ along the respective conducting section 58 and 62, to permit greater pulses of electrical energy input into the circuit of the electrically powered device to which the control is in circuit with.

In the embodiment illustrated, rotation of the actuator 16 approximately 316° from "low speed" position (FIG. 21) permits maximum magnitude of electrical energy input from the control to the associated circuit of the electrical energy powered device. In the maximum "high speed" position, the detent $24_a$ on the actuator engages in the recess $28_a$ on housing section $12_b$, to position the actuator in maximum "on" position.

Figure 9:
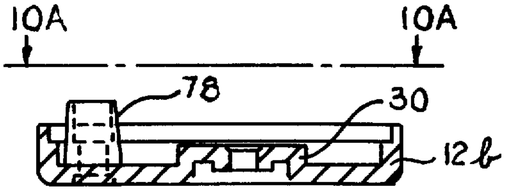
FIG. 9 is a sectional view of the housing section of FIG. 8 taken generally along the plane of line 9—9 of FIG. 8, looking in the direction of the arrows.

It will be seen that section 94 on embossment portion 39 (FIGS. 9 and 10A) of the housing section $12_b$ provides an abutment which is adapted for engagement with projecting arm abutment 96 on the actuator 16, to provide a positive stop for the actuator in either maximum rotated direction. In the embodiment illustrated, the maximum rotation of the actuator is approximately 345° for movement from "off" position to maximum high speed position.

As an example of a size of rotary control embodying the present invention, the outer housing or case 12 may have exterior dimensions of approximately 2 inches by 1.9 inches by 0.68 inch deep. It will be seen, therefore, that the present control is highly compact, greatly increasing its useability in varied environmental situations. Moreover, it will be seen that if the control becomes inoperative due to wear and usage, the housing or casing 12 may be readily opened by removal of the threaded fasteners 14, and new components of for instance either or both electrical contact member 19 or the support 34 with the printed circuitry thereon can be readily substituted into the housing, to provide a repaired control, and thus providing for rapid repair of the control.

From the foregoing description and accompanying drawings it will be seen that the invention provides a novel, highly compact electrical energy control for regulating the magnitude of electrical energy input into a circuit of an electrical powered device, such as for example, a portable hand tool, power appliances, etc. The control comprises a support on which is disposed a printed circuit including a resistance section, and a rotary actuator which includes electrical contacts thereon is rotatable about an axis disposed substantially perpendicular to the plane of the printed circuitry, with the contacts engaging in coaction with certain of the printed circuitry components during rotatable movement of the actuator member, so as to selectively control the magnitude of electrical energy applied to the associated electrically powered device. The invention also provides a rotary electrical energy control which can be expeditiously manufactured and assembled, and which results in a highly compact electronic control for effectively controlling the electrical input into the input circuit of an electrical energy powered device, and which possesses a considerable range of control movement.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a compact electrical energy control for controlling the magnitude of electrical energy input into an associated circuit load comprising, a support, a circuit including printed circuit components disposed on said support, and an actuator comprising a member rotatable about an axis disposed substantially perpendicular to the plane of said support, said member having electrical contacts thereon adapted for engaging coaction with certain of said printed circuit components during rotatable movement of said member so as to selectively control the actuation of said circuit and correspondingly variably control the magnitude of electrical energy to said circuit load, and cam means on said support adapted for engaging at least one of said electrical contacts, effective to move said one electrical contact out of engagement with the associated circuit to effectively disconnect it from a source of power.

2. A control in accordance with claim 1 wherein said certain printed circuit components include resistance means of generally arcuate configuration in plan.

3. A control in accordance with claim 2 wherein said support comprises a ceramic member, and an enclosing heat transfer member coacting with said ceramic member and providing a heat sink for said circuit components.

4. A control in accordance with claim 2 wherein one of the components of said support circuit comprises a solid state control switch means.

5. A control in accordance with claim 4 wherein said control switch means comprises a bidirectional current control switch, said current control switch having anode, cathode and gate electrodes.

6. A control in accordance with claim 2 wherein said resistance means comprises a circular resistance mat providing a plurality of resistance values, and a variable current switch means in the support circuit and in circuit with said resistance means, for providing a pulsive force of electrical energy through said control to an electrically powered device, the amount of pulsive force being dependent on the position of said electrical contacts on said rotary actuator with respect to said resistance means.

7. A control in accordance with claim 6 wherein said actuator member comprises a stem, one of said electrical conducting contacts on said actuator member engaging in slidable relation to said resistance mat during rotation of said stem for selectively changing the on-time of said switch means.

8. A control in accordance with claim 2 wherein said support circuit comprises solid state switching means including anode, cathode and gate electrodes, and triggering means in circuit with said gate electrode.

9. A control in accordance with claim 1 wherein said actuator extends through said support and is rotatable relative thereto, said electrical contacts being disposed in confronting relation to said certain of said printed circuit components and being rotatable with said actuator and with respect to said certain printed circuit components while being adapted to be in engaging coaction therewith.

10. In a compact electrical energy control for controlling the magnitude of electrical energy input into an associated circuit load comprising, a support, a circuit including printed circuit components disposed on said support, and an actuator comprising a member rotatable about an axis disposed substantially perpendicular to the plane of said support, said member having electrical contacts thereon adapted for engaging coaction with certain of said printed circuit components during rotatable movement of said member so as to selectively control the actuation of said circuit and correspondingly variably control the magnitude of electrical energy to said circuit load, said certain printed circuit components including resistance means of generally arcuate configuration in plan, and wherein said electrical contacts on said actuator member comprise three yieldable contact members electrically coupled to one another and each disposed at a preselected distance and position from the axis of rotation of said actuator member.

11. In a compact electrical energy control for controlling the magnitude of electrical energy input into an associated circuit load comprising, a support, a circuit including printed components disposed on said support, and an actuator comprising a member rotatable about an axis disposed substantially perpendicular to the plane of said support, said member having electrical contacts thereon adapted for engaging coaction with certain of said printed circuit components during rotatable movement of said member so as to selectively control the actuation of said circuit and correspondingly variably control the magnitude of electrical energy to said circuit load, said actuator extending through said support and being rotatable relative thereto, said electrical contacts being disposed in confronting relation to said certain of said printed circuit components and being rotatable with said actuator and with respect to said certain printed circuit components while being adapted to be in engaging coaction therewith, and wherein said actuator comprises a stem portion and a base portion, said electrical contacts being mounted on said base portion, said support having an opening therethrough through which said stem portion extends.

12. In a compact electrical energy control for controlling the speed of an associated electrical motor comprising, a non-electrically conducting support, said support having a generally planar surface, circuit components secured to said surface and disposed substantially in the plane of said surface, an actuator comprising a member rotatable about an axis disposed substantially perpendicular to said plane, said member having electrical contact means thereon adapted for engaging coaction with at least certain of said circuit components during rotatable movement of said member so as to selectively control the magnitude of electrical energy able to pass through said control to thus control the speed of the associated electrical motor, cam means on said support adapted for engagement with at least one of said electrical contact means effective to move the latter out of engagement with the associated circuit effective to disconnect it from a source of power, and means for locating the actuator in full off position generally coincident with said one contact means being moved by said cam means out of engagement with said associated circuit.

13. A control in accordance with claim 12 wherein said contact means comprises an electrical energy transmitting member having resilient arms projecting outwardly therefrom, each of said arms having an abutting portion on the distal end thereof, said arms being biased in the direction toward said surface and toward said certain circuit components.

14. A control in accordance with claim 12 including a heat sink member generally encompassing said support, said support being disposed in thermally conducting relation within said heat sink member.

15. A control in accordance with claim 12 wherein said actuator comprises a stem portion and a base portion, said base portion being disposed in a plane generally perpendicular to the axis of said stem portion, said electrical contact means being supported on said base portion and having a plurality of resilient arms with an abutting portion on each distal end thereof, said abutting portions being disposed in confronting engaged relation with said certain circuit components, and means for preventing substantial axial movement of said actuator but permitting rotatable movement thereof, whereby the position of said contacts with respect to said certain circuit components can be selectively varied to vary the magnitude of electrical energy able to pass through said control to the associated electric motor.

16. A control in accordance with claim 15 wherein said cam means comprises an electrically conducting raised protrusion member mounted on said support for rapidly raising one resilient arm relative to the other resilient arms, and to tension the respective resilient arm against its resistance to deformation, said control including a housing from which said actuator extends, and said locating means including means on said actuator coacting with means on said control housing for locating said actuator in either full on or full off position, upon predetermined rotation of said actuator relative to said housing.

17. A control in accordance with claim 12 wherein one of said circuit components comprises a variable current solid state control switch, having anode, cathode and gate electrodes, another of said circuit components comprising a resistance of arcuate configuration in plan adapted for engagement with said contact means, and triggering means for said gate electrode.

18. In a compact electrical energy control for controlling the speed of an associated electrical motor comprising, a non-electrically conducting support, said support having a generally planar surface, circuit components secured to said surface and disposed substantially in the plane of said surface, an actuator comprising a member rotatable about an axis disposed substantially perpendicular to said plane, said member having an electrical contact means thereon adapted for engaging coaction with at least certain of said circuit component during rotatable movement of said member so as to selectively control the magnitude of electrical energy able to pass through said control to thus control the speed of the associated electrical motor, and including a housing for said control, said actuator member extending out of said housing, means interiorly of said housing for rotatably mounting said actuator member thereon, and other means on said housing preventing substantial axial movement of said actuator but permitting rotatable movement of said actuator with respect to said housing.

19. A control in accordance with claim 18 wherein said means in said housing rotatably mounting said actuator comprises an embossment having an opening therethrough, and means on one end of said actuator rotatably received in said opening.

20. In a compact electrical energy control for controlling the speed of an associated electrical motor comprising, a non-electrically conducting support, said support having a generally planar surface, circuit components secured to said surface and disposed substantially in the plane of said surface, an actuator comprising a member rotatable about an axis disposed substantially perpendicular to said plane, said member having an electrical contact means thereon adapted for engaging coaction with at least certain of said circuit components during rotatable movement of said member so as to selectively control the magnitude of electrical energy able to pass through said control to thus control the speed of the associated electrical motor, and including a housing for said control, said support being received in said housing, said circuit components facing inwardly of said housing, and means on said housing holding said support in predetermined position in said housing.

* * * * *